March 25, 1941.  A. C. WILCOX  2,235,911
ELECTRIC CASSEROLE
Filed Sept. 19, 1938  2 Sheets-Sheet 1

Inventor
Albert C. Wilcox
By Frease and Bishop
Attorneys

March 25, 1941.　　　A. C. WILCOX　　　2,235,911
ELECTRIC CASSEROLE
Filed Sept. 19, 1938　　　2 Sheets-Sheet 2

Inventor
Albert C. Wilcox
By Pease and Bishop
Attorneys

Patented Mar. 25, 1941

2,235,911

UNITED STATES PATENT OFFICE 2,235,911

ELECTRIC CASSEROLE

Albert C. Wilcox, Minerva, Ohio

Application September 19, 1938, Serial No. 230,585

4 Claims. (Cl. 219—44)

The invention relates to electric casseroles, and more particularly to a casserole adapted for use upon a dining room table and so constructed that it will bake in the same manner as an oven.

An object of the invention is to provide an electric casserole comprising a heating chamber adapted to be closed by a cover, and having an inner heating chamber located therein, into which the baking dish or pan is suspended.

A further object is to provide a casserole of this general type with means for retarding the browning of the food until it is baked through.

A still further object is to provide a heat distributing chamber below the inner heating chamber, an electric heating element being located in the bottom of said heat distributing chamber.

Another object is to provide a casserole of the character referred to in which means is provided for controlling the distribution of heat to the upper portion of the outer heating chamber, or above the dish or pan in which the food is being cooked.

Still another object of the invention is to provide a rotatable cover for the outer heating chamber with means for controlling the distribution of heat to the upper portion of the heating chamber.

A further object is to provide a vertically movable valve extending through the cover for controlling the distribution of heat to a point above the food containing dish or pan.

Another object is to provide means whereby the inner heating chamber may be removed without disturbing the heat distributing chamber or the heating element located therein.

A further object is to provide such a casserole having an upper heating element located within the cover.

A still further object is to provide means for regulating the electric heating element so as to vary the amount of heat released therefrom.

Figure 1:
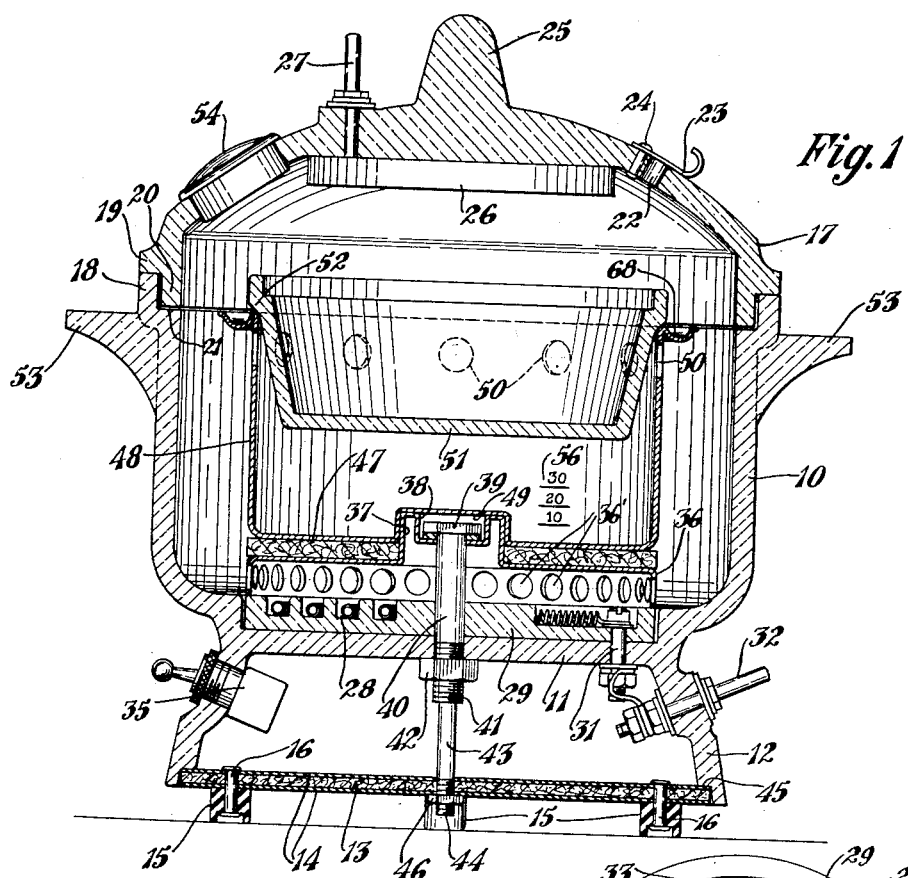
Figure 2:
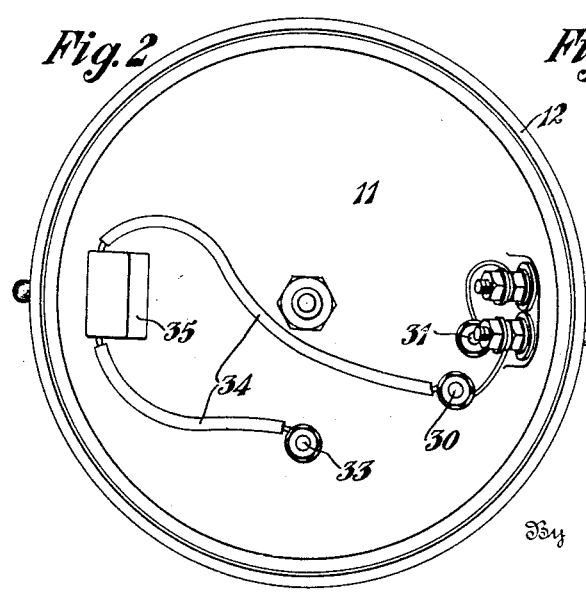
Figure 3:
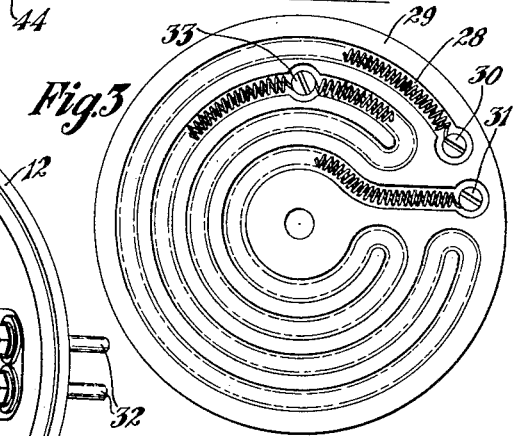
Figure 5:
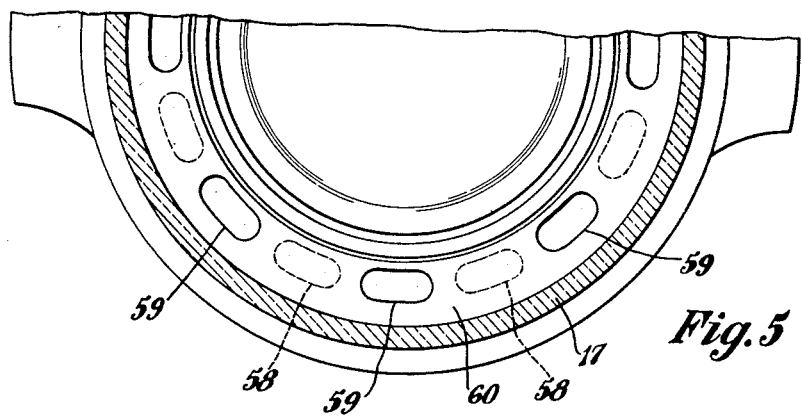
Figure 4:
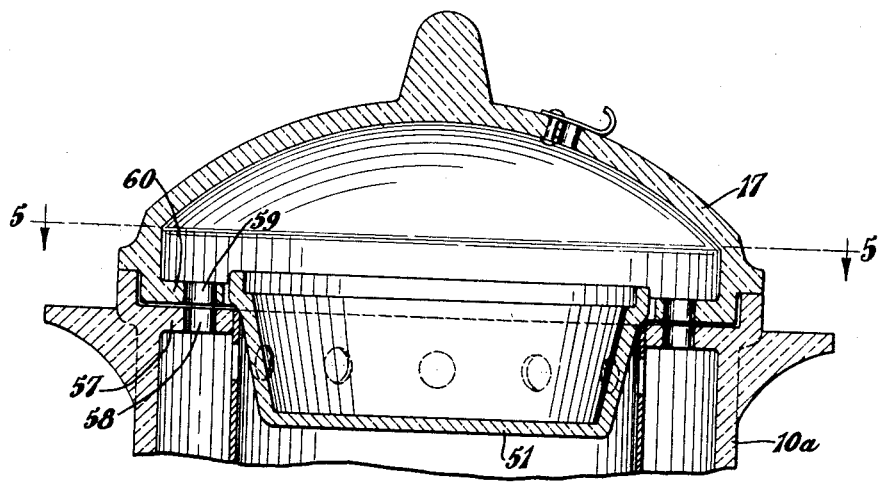

The above objects, together with others which will be apparent from the drawings and following description, or which may be later referred to, may be attained by constructing the improved electric casserole in the manner illustrated in the accompanying drawings, in which Figure 1 is a vertical sectional view through an electric casserole constructed in accordance with the invention;

Fig. 2, a bottom plan view of the same with the bottom plate removed;

Fig. 3, a plan view of the lower heating element;

Fig. 4, a vertical sectional view through the upper portion of a slightly modified form of the invention showing means upon the cover for controlling the distribution of heat to the upper portion of the heating chamber;

Fig. 5, a fragmentary section taken as on the line 5—5, Fig. 4; and

Figure 6:
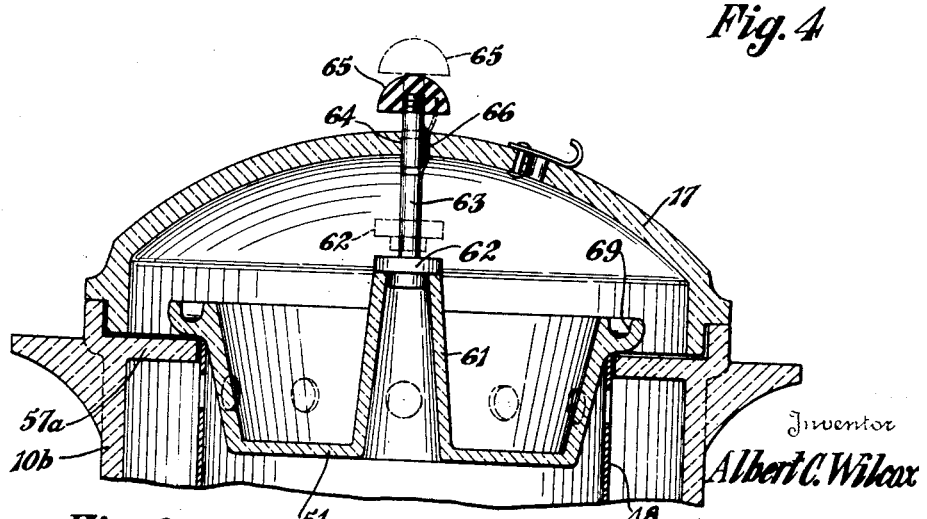

Fig. 6, a vertical sectional view through the upper portion of another modification showing a valve for controlling the distribution of heat to the upper portion of the device.

Similar numerals refer to similar parts throughout the drawings.

The casserole may be enclosed within a shell 10 which may be formed of porcelain as indicated in the drawings, although various kinds of metal such as aluminum, stainless steel or the like, or enamelled ware may be used for forming the same.

A bottom wall 11 is formed upon this shell and if desired, the base 12 may be formed integrally therewith. This base is closed at its lower end as by an asbestos plate 13 of substantial thickness, upon either side of which may be located metal sheets 14.

upon this asbestos sheet and is provided with the depending feet 15 which may be formed of rubber, Bakelite or other suitable material and which are connected to the bottom plate as by rivets 16, thus providing means whereby the casserole may be placed upon a dining room table or other highly finished surface without marring the same or permitting damage thereto by heat.

The cover 17 for this outer shell is preferably formed of glass so that the food cooking within the device may be inspected without removing the cover. However, it should be understood that any other suitable material such as porcelain, metal, enamel ware or the like may be used.

Any suitable lock joint may be provided between the cover and the shell 10 and the joint is preferably constructed as shown, an upright, outwardly offset flange 18 surrounding the upper open end of the shell, the cover having a peripheral flange 19 resting upon the flange 18 and having a depending flange 20 fitting within the flange 18 and resting upon the upper edge 21 of the shell.

A steam release aperture 22 is provided in the cover and adapted to be closed as by the valve 23 which may be pivoted upon the cover as by the rivet 24. A knob 25 is provided for lifting the cover from the shell and if desired, an upper electric heating element 26 may be located within the cover and provided with the usual plug-in points 27 to which a connector plug of usual design may be attached.

A lower heating element indicated generally at 28 and housed within the usual insulation disk 29 is mounted upon the bottom wall 11 of the shell 10 and the two terminals 30 and 31 of said heating element are connected to plug-in points 32 which extend outward through the base 12 for connection to the usual connector plug.

For the purpose of providing a two-heat stage type of heating element, the element 28 may be tapped intermediate its ends as indicated at 33, the wire 34 leading from said tap through a switch 35 and then to the terminal 30, whereby the current may be passed through the entire heating element from one end thereof to the other or may be shunted around a portion thereof as desired.

An inverted cup-shaped shell 36, preferably of sheet metal, is located over the lower heating element and provided around its depending side wall with openings 36' for distributing the heat around the interior of the shell 10. This sheet metal shell 36 may be provided with the central boss 37 having the concentric depression 38 therein to receive the head 39 of the center bolt 40, which is threaded intermediate its ends as at 41 to receive the nut 42 which clamps the heat distributing shell 36 and the lower element 29 against the bottom wall 11 of the outer shell 10, this bolt being reduced at its lower end portion as at 43, the threaded end 44 extending through a central opening in the bottom plate 13—14 which is clamped within the circumferential groove 45 in the lower end of the base as by the clamping nut 46.

A thick sheet of asbestos indicated at 47 is located on top of the shell 36 and the inner heating chamber shell 48, in the form of a bowl, rests upon this asbestos sheet and is provided with the central socket 49 which centers the shell over the boss 37.

Apertures 50 are provided around the upper portion of the inner shell 48 and a baking dish or pan, as indicated at 51, is adapted to be suspended within the upper open end of this shell, the dish being provided with the peripheral shoulder 52 at its upper portion to rest upon the upper end of the shell 48.

Any suitable design of handles 53 may be provided upon the outer shell 10 for lifting the entire device and if desired, a heat indicator 54 may be provided in the cover for showing the temperature within the outer shell.

In order to retard the baking operation, when the food being cooked in the food container 51 takes a little longer to bake through, water may be placed in the inner shell 48, which may be graduated as indicated at 56, the figures adjacent to these graduations showing the length of time the baking through of the food will be retarded with the water at that level.

In the operation of the casserole, the heating element 28 is turned on for a short period, or until the temperature in the casserole reaches about 350°, after which the food to be baked is placed in the container 51 and the cover is replaced upon the shell 10.

If it is desired to prolong the baking of the food, water is placed in the shell 48 to the desired level and after this water boils dry the baking process begins more vigorously.

The asbestos 47 baffles the heat from the inner chamber 48, the intense heat passing out through the openings 36' from the heat distributing chamber 36 and flowing up and over the top of the food in the container 51, a certain amount of the heat passing through the openings 50 in the shell 48, and around the outside of the container 51. The browning of the food can be controlled more accurately by opening the steam release valve 23 in the cover.

If it is desired to brown the top of the food quickly, the upper element 26 may be turned on, and if for any reason it is desirable to cook the food over a slow fire, the switch 35 may be operated to produce a low heat from the lower element 28.

In Figs. 4 and 5 is shown a slight modification of the invention designed to retard the browning of the food in the container 51. The upper edge portion of the outer shell 10a is provided with an inwardly disposed, horizontal, annular flange 57 extending inward to the inner shell 48, and provided with openings 58 adapted to register with the similar openings 59 in the flange 60 upon the cover when it is desired to admit heat to the top of the casserole, as shown in Fig. 4, and adapted to be moved out of register with said openings 58, by twisting or turning the cover to the position shown in Fig. 5, when it is desired to prevent the flow of heat to the upper portion of the casserole.

Another modification of the invention for preventing the heat from being admitted to the top of the casserole is shown in Fig. 6, in which the outer shell 10b is provided with an inturned, imperforate, annular flange 57a extending to the inner shell 48 and cutting off the flow of heat upward around the inner shell. In this form of the invention the food container 51a is provided with a central, conical tube 61 which may extend upward above the top of the container and adapted to be normally closed as by the drop valve 62 having a stem 63 slidably mounted through an opening 64 in the cover and provided with an operating knob 65 at its upper end, a spring 66 being provided for holding the valve in the raised or open position, when it is desired to admit heat through the tube 61 to the top of the casserole, as shown in broken lines in Fig. 6.

With any of the forms of the invention above described and illustrated in the accompanying drawings, after the food has been cooked as above described the food container may be removed from the casserole and placed in an ornamental metal holder as in ordinary practice, or if desired, the cover 17 may be removed from the casserole and the food served directly from the food container without removing the container from the shell.

It has been found in practice that in cooking some foods there is a tendency for the juices cooking from the food to overflow from the container and run down the outside of the inner shell and when these juices come in contact with the electric heating element a slight smoke is caused.

In order to overcome this slight objection, an annular trough or groove 68, as shown in Fig. 1, may be formed around the upper open end of the inner shell, the edge of the food container extending slightly over this trough so that any juices cooking out of the food in the container will flow into the trough and be trapped there so that none of these juices can come in contact with the heating element.

If desired, this trough or groove for catching any overflow of juices may be formed upon the food container as shown at 69 in Fig. 6. As illustrated in this figure the trough 69 may be integrally formed around the upper open end of the food container and in the same manner as described regarding the trough or groove 68, shown in Fig. 1, will catch all juices which may cook from the food in the container and prevent them from coming into contact with the electric heating element.

Although the drawings show deep food containers of the general size and shape ordinarily used for the baking of such foods as vegetables, macaroni and the like, it should be understood that the invention also contemplates the use of a food container of less depth but otherwise constructed exactly as shown, adapted for the baking of pies, as it has been found by experience that the improved casserole is particularly well adapted for baking excellent pies.

I claim:

1. An electric casserole including an outer shell, a heating element in the lower portion of the outer shell, an inner shell above the heating element and spaced around its sides from the outer shell and open at its upper end, a food container supported at the upper open end of the inner shell, a cover upon the outer shell, an inturned flange at the upper end of the outer shell extending to the inner shell, and an inturned flange upon the cover adapted to rest upon said flange on the outer shell, there being openings in said flanges adapted to register when the cover is in one position and adapted to be closed when the cover is in another position.

2. An electric casserole including an outer shell, a heating element in the lower portion of the outer shell, an inner shell above the heating element and spaced around its sides from the outer shell and open at its upper end, a food container supported at the upper open end of the inner shell, a cover upon the outer shell, an inturned flange at the upper end of the outer shell extending to the inner shell, a tube extending up through the food container, and a valve for closing said tube.

3. An electric casserole including an outer shell, a heating element in the lower portion of the outer shell, an inner shell above the heating element and spaced around its sides from the outer shell and open at its upper end, a food container supported at the upper open end of the inner shell, a cover upon the outer shell, horizontal flange means extending from the upper end of the outer shell to the inner shell, and means for controlling the distribution of heat from the heating element to the upper portion of the casserole.

4. An electric casserole including an outer shell, a heating element in the lower portion of the outer shell, an inner shell above the heating element and spaced around its sides from the outer shell and open at its upper end, a food container supported at the open end of the shell, a cover upon the outer shell spaced above and extending over the inner shell and the food container, an inturned flange at the upper end of the outer shell extending to the inner shell for normally cutting off communication between the space below said flange and the space above the flange and within the cover, and manually controlled means for providing communication between said spaces so as to control the distribution of heat from the heating element to the upper portion of the casserole.

ALBERT C. WILCOX.